United States Patent
Huang et al.

(10) Patent No.: US 11,558,777 B2
(45) Date of Patent: Jan. 17, 2023

(54) METHODS OF MULTI-LINK BUFFER MANAGEMENT WITHOUT BLOCK ACKNOWLEDGEMENT (BA) NEGOTIATION

(71) Applicant: Intel Corporation, Santa Clara, CA (US)

(72) Inventors: Po-Kai Huang, San Jose, CA (US); Daniel F. Bravo, Hillsboro, OR (US); Laurent Cariou, Portland, OR (US)

(73) Assignee: Intel Corporation, Santa Clara, CA (US)

( * ) Notice: Subject to any disclaimer, the term of this patent is extended or adjusted under 35 U.S.C. 154(b) by 190 days.

(21) Appl. No.: 16/728,181

(22) Filed: Dec. 27, 2019

(65) Prior Publication Data
US 2020/0137626 A1  Apr. 30, 2020

Related U.S. Application Data

(60) Provisional application No. 62/785,794, filed on Dec. 28, 2018.

(51) Int. Cl.
| | |
|---|---|
| H04W 72/04 | (2009.01) |
| H04W 28/06 | (2009.01) |
| H04W 80/02 | (2009.01) |
| H04L 1/16 | (2006.01) |
| H04W 28/02 | (2009.01) |
| H04L 1/18 | (2006.01) |
| H04W 84/12 | (2009.01) |

(52) U.S. Cl.
CPC .......... *H04W 28/06* (2013.01); *H04L 1/1621* (2013.01); *H04L 1/1819* (2013.01); *H04W 28/0278* (2013.01); *H04W 80/02* (2013.01); *H04W 84/12* (2013.01)

(58) Field of Classification Search
CPC ............ H04W 28/06; H04W 28/0278; H04W 28/0263; H04W 80/02; H04W 84/12; H04W 88/10; H04L 1/1621; H04L 1/1819; H04L 1/0017; H04L 1/0025; H04L 1/0001; H04L 1/1671; H04L 1/1835; H04L 45/121; H04L 45/125; H04L 45/24

See application file for complete search history.

(56) References Cited

U.S. PATENT DOCUMENTS

| | | | |
|---|---|---|---|
| 7,734,978 B2 * | 6/2010 | Nakashima ........... | H04L 1/1607 714/748 |
| 2018/0206143 A1 * | 7/2018 | Patil ...................... | H04W 40/02 |
| 2019/0082373 A1 * | 3/2019 | Patil .................... | H04W 40/244 |

(Continued)

*Primary Examiner* — Mahbubul Bar Chowdhury
(74) *Attorney, Agent, or Firm* — Schwegman Lundberg & Woessner, P.A.

(57) ABSTRACT

Embodiments of a multi-link device (MLD) are generally described herein. The MLD may be configured for multi-link communication on a plurality of links. The MLD may be configured with a plurality of stations (STAs). Each STA may be a logical entity that includes a singly addressable instance of a medium access control (MAC) layer and a physical (PHY) layer of a link of the plurality of links. The MLD may configure traffic identifier (TID) assignment for the MLD for multi-link communication with another MLD. The multi-link communication may be configurable to support one or more data streams, wherein each of the data streams corresponds to a TID. The MLD may determine an assignment of the TIDs to the STAs of the MLD.

18 Claims, 8 Drawing Sheets

(56) References Cited

U.S. PATENT DOCUMENTS

| | | | |
|---|---|---|---|
| 2020/0120603 A1* | 4/2020 | Seok | H04W 52/0229 |
| 2020/0359259 A1* | 11/2020 | Patil | H04W 48/16 |
| 2021/0007168 A1* | 1/2021 | Asterjadhi | H04W 52/0219 |
| 2021/0014911 A1* | 1/2021 | Patil | H04W 4/23 |
| 2021/0126947 A1* | 4/2021 | Wang | H04W 12/0433 |
| 2021/0144589 A1* | 5/2021 | Seok | H04L 47/365 |
| 2021/0144787 A1* | 5/2021 | Kwon | H04W 72/121 |

* cited by examiner

METHODS OF MULTI-LINK BUFFER MANAGEMENT WITHOUT BLOCK ACKNOWLEDGEMENT (BA) NEGOTIATION

PRIORITY CLAIM

This application claims priority under 35 USC 119(e) to U.S. Provisional Patent Application Ser. No. 62/785,794, filed Dec. 28, 2018 [reference number AB8001-Z, 1884.984PRV], which is incorporated herein by reference in its entirety.

TECHNICAL FIELD

Embodiments pertain to wireless networks and wireless communications. Some embodiments relate to wireless local area networks (WLANs) and Wi-Fi networks including networks operating in accordance with the IEEE 802.11 family of standards. Some embodiments relate to Extremely High Throughput (EHT) protocols. Some embodiments relate to methods, computer readable media, and apparatus for multi-link buffer management without block acknowledgement (BA) negotiation.

BACKGROUND

Efficient use of the resources of a wireless local-area network (WLAN) is important to provide bandwidth and acceptable response times to the users of the WLAN. However, often there are many devices trying to share the same resources and some devices may be limited by the communication protocol they use or by their hardware bandwidth. Moreover, wireless devices may need to operate with both newer protocols and with legacy device protocols.

BRIEF DESCRIPTION OF THE DRAWINGS

The present disclosure is illustrated by way of example and not limitation in the figures of the accompanying drawings, in which like references indicate similar elements and in which.

DESCRIPTION

The following description and the drawings sufficiently illustrate specific embodiments to enable those skilled in the art to practice them. Other embodiments may incorporate structural, logical, electrical, process, and other changes. Portions and features of some embodiments may be included in, or substituted for, those of other embodiments. Embodiments set forth in the claims encompass all available equivalents of those claims.

Figure 1:
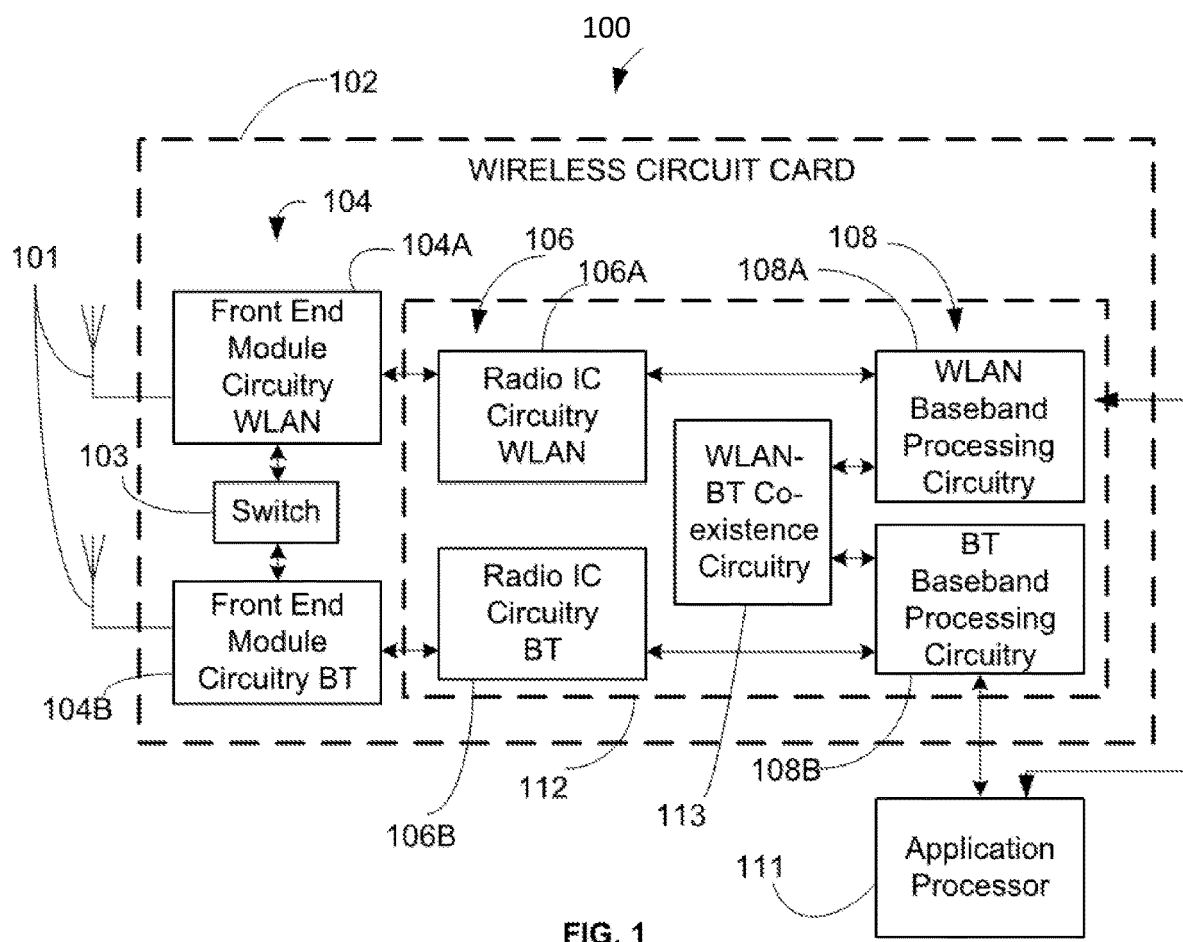
FIG. 1 is a block diagram of a radio architecture in accordance with some embodiments.

FIG. 1 is a block diagram of a radio architecture 100 in accordance with some embodiments. Radio architecture 100 may include radio front-end module (FEM) circuitry 104, radio IC circuitry 106 and baseband processing circuitry 108. Radio architecture 100 as shown includes both Wireless Local Area Network (WLAN) functionality and Bluetooth (BT) functionality although embodiments are not so limited. In this disclosure, "WLAN" and "Wi-Fi" are used interchangeably.

FEM circuitry 104 may include a WLAN or Wi-Fi FEM circuitry 104A and a Bluetooth (BT) FEM circuitry 104B. The WLAN FEM circuitry 104A may include a receive signal path comprising circuitry configured to operate on WLAN RF signals received from one or more antennas 101, to amplify the received signals and to provide the amplified versions of the received signals to the WLAN radio IC circuitry 106A for further processing. The BT FEM circuitry 104B may include a receive signal path which may include circuitry configured to operate on BT RF signals received from one or more antennas 101, to amplify the received signals and to provide the amplified versions of the received signals to the BT radio IC circuitry 106B for further processing. FEM circuitry 104A may also include a transmit signal path which may include circuitry configured to amplify WLAN signals provided by the radio IC circuitry 106A for wireless transmission by one or more of the antennas 101. In addition, FEM circuitry 104B may also include a transmit signal path which may include circuitry configured to amplify BT signals provided by the radio IC circuitry 106B for wireless transmission by the one or more antennas. In the embodiment of FIG. 1, although FEM 104A and FEM 104B are shown as being distinct from one another, embodiments are not so limited, and include within their scope the use of an FEM (not shown) that includes a transmit path and/or a receive path for both WLAN and BT signals, or the use of one or more FEM circuitries where at least some of the FEM circuitries share transmit and/or receive signal paths for both WLAN and BT signals.

Radio IC circuitry 106 as shown may include WLAN radio IC circuitry 106A and BT radio IC circuitry 106B. The WLAN radio IC circuitry 106A may include a receive signal path which may include circuitry to down-convert WLAN RF signals received from the FEM circuitry 104A and provide baseband signals to WLAN baseband processing circuitry 108A. BT radio IC circuitry 106B may in turn include a receive signal path which may include circuitry to down-convert BT RF signals received from the FEM circuitry 104B and provide baseband signals to BT baseband processing circuitry 108B. WLAN radio IC circuitry 106A may also include a transmit signal path which may include circuitry to up-convert WLAN baseband signals provided by the WLAN baseband processing circuitry 108A and provide WLAN RF output signals to the FEM circuitry 104A for subsequent wireless transmission by the one or more antennas 101. BT radio IC circuitry 106B may also include a transmit signal path which may include circuitry to up-convert BT baseband signals provided by the BT baseband processing circuitry 108B and provide BT RF output signals to the FEM circuitry 104B for subsequent wireless transmission by the one or more antennas 101. In the embodiment of FIG. 1, although radio IC circuitries 106A and 106B are shown as being distinct from one another, embodiments are not so limited, and include within their scope the use of a radio IC circuitry (not shown) that includes a transmit signal path and/or a receive signal path for both WLAN and BT signals, or the use of one or more radio IC circuitries where at least some of the radio IC circuitries share transmit and/or receive signal paths for both WLAN and BT signals.

Baseband processing circuitry 108 may include a WLAN baseband processing circuitry 108A and a BT baseband processing circuitry 108B. The WLAN baseband processing circuitry 108A may include a memory, such as, for example, a set of RAM arrays in a Fast Fourier Transform or Inverse Fast Fourier Transform block (not shown) of the WLAN baseband processing circuitry 108A. Each of the WLAN baseband circuitry 108A and the BT baseband circuitry 108B may further include one or more processors and control logic to process the signals received from the corresponding WLAN or BT receive signal path of the radio IC circuitry 106, and to also generate corresponding WLAN or BT baseband signals for the transmit signal path of the radio IC circuitry 106. Each of the baseband processing circuitries 108A and 108B may further include physical layer (PHY) and medium access control layer (MAC) circuitry, and may further interface with application processor 111 for generation and processing of the baseband signals and for controlling operations of the radio IC circuitry 106.

Referring still to FIG. 1, according to the shown embodiment, WLAN-BT coexistence circuitry 113 may include logic providing an interface between the WLAN baseband circuitry 108A and the BT baseband circuitry 108B to enable use cases requiring WLAN and BT coexistence. In addition, a switch 103 may be provided between the WLAN FEM circuitry 104A and the BT FEM circuitry 104B to allow switching between the WLAN and BT radios according to application needs. In addition, although the antennas 101 are depicted as being respectively connected to the WLAN FEM circuitry 104A and the BT FEM circuitry 104B, embodiments include within their scope the sharing of one or more antennas as between the WLAN and BT FEMs, or the provision of more than one antenna connected to each of FEM 104A or 104B.

In some embodiments, the front-end module circuitry 104, the radio IC circuitry 106, and baseband processing circuitry 108 may be provided on a single radio card, such as wireless radio card 102. In some other embodiments, the one or more antennas 101, the FEM circuitry 104 and the radio IC circuitry 106 may be provided on a single radio card. In some other embodiments, the radio IC circuitry 106 and the baseband processing circuitry 108 may be provided on a single chip or integrated circuit (IC), such as IC 112.

In some embodiments, the wireless radio card 102 may include a WLAN radio card and may be configured for Wi-Fi communications, although the scope of the embodiments is not limited in this respect. In some of these embodiments, the radio architecture 100 may be configured to receive and transmit orthogonal frequency division multiplexed (OFDM) or orthogonal frequency division multiple access (OFDMA) communication signals over a multicarrier communication channel. The OFDM or OFDMA signals may comprise a plurality of orthogonal subcarriers.

In some of these multicarrier embodiments, radio architecture 100 may be part of a Wi-Fi communication station (STA) such as a wireless access point (AP), a base station or a mobile device including a Wi-Fi device. In some of these embodiments, radio architecture 100 may be configured to transmit and receive signals in accordance with specific communication standards and/or protocols, such as any of the Institute of Electrical and Electronics Engineers (IEEE) standards including, IEEE 802.11n-2009, IEEE 802.11-2012, IEEE 802.11-2016, IEEE 802.11ac, and/or IEEE 802.11ax standards, Extremely High Throughput (EHT) standards, and/or proposed specifications for WLANs, although the scope of embodiments is not limited in this respect. Radio architecture 100 may also be suitable to transmit and/or receive communications in accordance with other techniques and standards.

In some embodiments, the radio architecture 100 may be configured to communicate in accordance with EHT techniques/protocols and/or other 802.11 techniques/protocols. In these embodiments, the radio architecture 100 may be configured to communicate in accordance with an OFDMA technique, although the scope of the embodiments is not limited in this respect.

In some other embodiments, the radio architecture 100 may be configured to transmit and receive signals transmitted using one or more other modulation techniques such as spread spectrum modulation (e.g., direct sequence code division multiple access (DS-CDMA) and/or frequency hopping code division multiple access (FH-CDMA)), time-division multiplexing (TDM) modulation, and/or frequency-division multiplexing (FDM) modulation, although the scope of the embodiments is not limited in this respect.

In some embodiments, as further shown in FIG. 1, the BT baseband circuitry 108B may be compliant with a Bluetooth (BT) connectivity standard such as Bluetooth, Bluetooth 4.0 or Bluetooth 5.0, or any other iteration of the Bluetooth Standard. In embodiments that include BT functionality as shown for example in FIG. 1, the radio architecture 100 may be configured to establish a BT synchronous connection oriented (SCO) link and/or a BT low energy (BT LE) link. In some of the embodiments that include functionality, the radio architecture 100 may be configured to establish an extended SCO (eSCO) link for BT communications, although the scope of the embodiments is not limited in this respect. In some of these embodiments that include a BT functionality, the radio architecture may be configured to engage in a BT Asynchronous Connection-Less (ACL) communications, although the scope of the embodiments is not limited in this respect. In some embodiments, as shown in FIG. 1, the functions of a BT radio card and WLAN radio card may be combined on a single wireless radio card, such as single wireless radio card 102, although embodiments are not so limited, and include within their scope discrete WLAN and BT radio cards In some embodiments, the radio-architecture 100 may include other radio cards, such as a cellular radio card configured for cellular (e.g., 3GPP such as LTE, LTE-Advanced or 5G communications).

In some IEEE 802.11 embodiments, the radio architecture 100 may be configured for communication over various channel bandwidths including bandwidths having center frequencies of about 900 MHz, 2.4 GHz, 5 GHz, and bandwidths of about 1 MHz, 2 MHz, 2.5 MHz, 4 MHz, 5 MHz, 8 MHz, 10 MHz, 16 MHz, 20 MHz, 40 MHz, 80 MHz (with contiguous bandwidths) or 80+80 MHz (160 MHz) (with non-contiguous bandwidths). In some embodiments, a 320 MHz channel bandwidth may be used. The scope of the embodiments is not limited with respect to the above center frequencies however.

Figure 2:
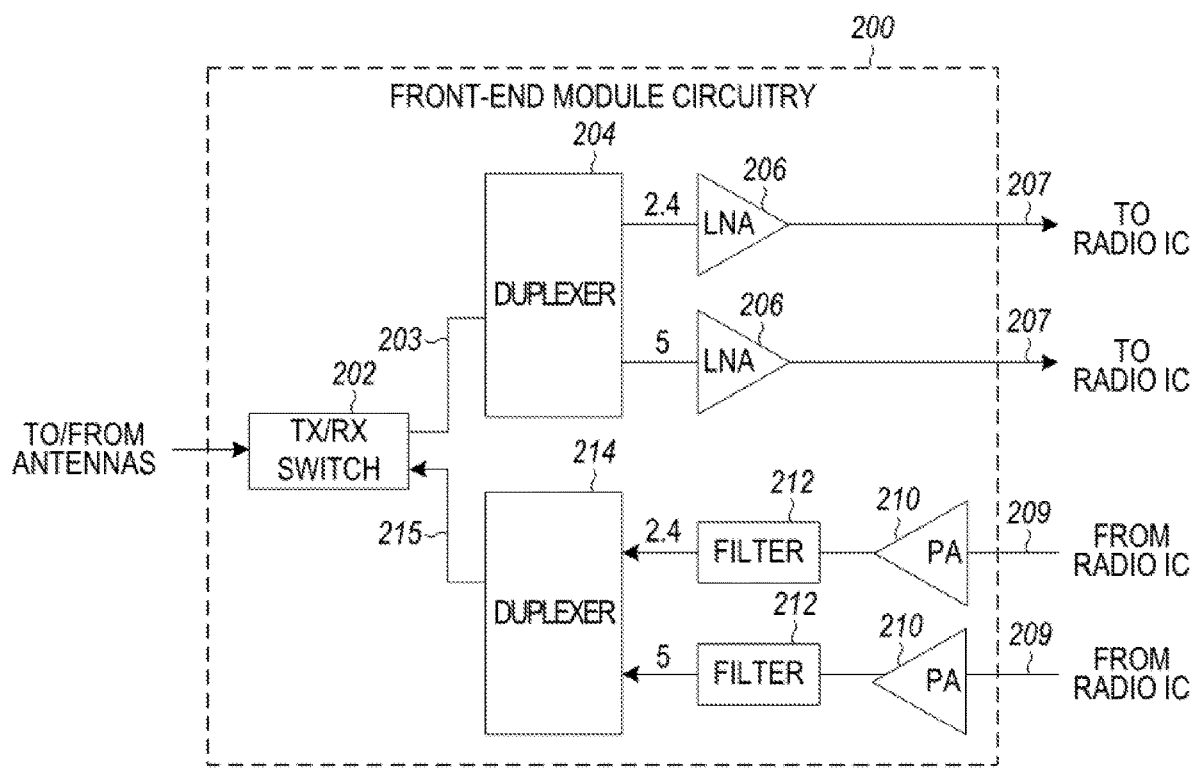
FIG. 2 illustrates a front-end module circuitry for use in the radio architecture of FIG. 1 in accordance with some embodiments.

FIG. 2 illustrates FEM circuitry 200 in accordance with some embodiments. The FEM circuitry 200 is one example of circuitry that may be suitable for use as the WLAN and/or BT FEM circuitry 104A/104B (FIG. 1), although other circuitry configurations may also be suitable.

In some embodiments, the FEM circuitry 200 may include a TX/RX switch 202 to switch between transmit mode and receive mode operation. The FEM circuitry 200 may include a receive signal path and a transmit signal path. The receive signal path of the FEM circuitry 200 may include a low-noise amplifier (LNA) 206 to amplify received RF signals 203 and provide the amplified received RF signals 207 as an output (e.g., to the radio IC circuitry 106 (FIG. 1)). The transmit signal path of the circuitry 200 may include a power amplifier (PA) to amplify input RF signals 209 (e.g., provided by the radio IC circuitry 106), and one or more filters 212, such as band-pass filters (BPFs), low-pass filters (LPFs) or other types of filters, to generate RF signals 215 for subsequent transmission (e.g., by one or more of the antennas 101 (FIG. 1)).

In some dual-mode embodiments for Wi-Fi communication, the FEM circuitry 200 may be configured to operate in either the 2.4 GHz frequency spectrum or the 5 GHz frequency spectrum. In these embodiments, the receive signal path of the FEM circuitry 200 may include a receive signal path duplexer 204 to separate the signals from each spectrum as well as provide a separate LNA 206 for each spectrum as shown. In these embodiments, the transmit signal path of the FEM circuitry 200 may also include a power amplifier 210 and a filter 212, such as a BPF, a LPF or another type of filter for each frequency spectrum and a transmit signal path duplexer 214 to provide the signals of one of the different spectrums onto a single transmit path for subsequent transmission by the one or more of the antennas 101 (FIG. 1). In some embodiments, BT communications may utilize the 2.4 GHZ signal paths and may utilize the same FEM circuitry 200 as the one used for WLAN communications.

Figure 3:
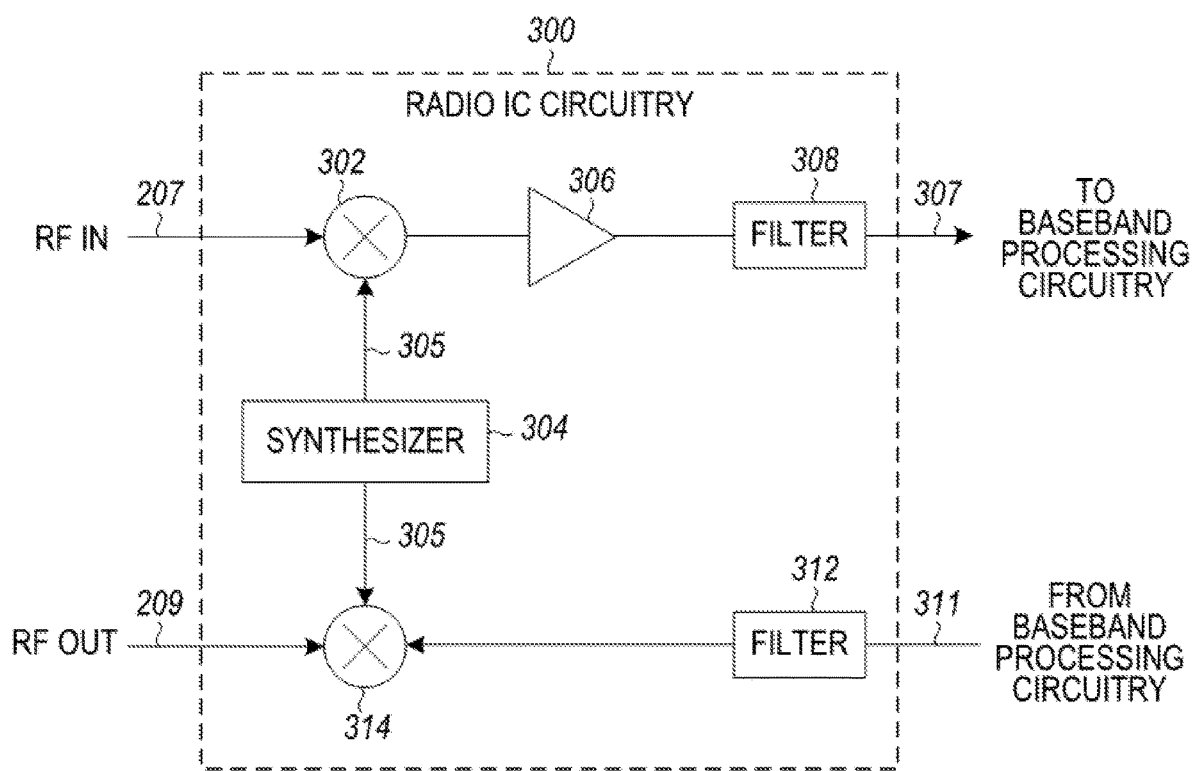
FIG. 3 illustrates a radio IC circuitry for use in the radio architecture of FIG. 1 in accordance with some embodiments.

FIG. 3 illustrates radio IC circuitry 300 in accordance with some embodiments. The radio IC circuitry 300 is one example of circuitry that may be suitable for use as the WLAN or BT radio IC circuitry 106A/106B (FIG. 1), although other circuitry configurations may also be suitable.

In some embodiments, the radio IC circuitry 300 may include a receive signal path and a transmit signal path. The receive signal path of the radio IC circuitry 300 may include at least mixer circuitry 302, such as, for example, down-conversion mixer circuitry, amplifier circuitry 306 and filter circuitry 308. The transmit signal path of the radio IC circuitry 300 may include at least filter circuitry 312 and mixer circuitry 314, such as, for example, up-conversion mixer circuitry. Radio IC circuitry 300 may also include synthesizer circuitry 304 for synthesizing a frequency 305 for use by the mixer circuitry 302 and the mixer circuitry 314. The mixer circuitry 302 and/or 314 may each, according to some embodiments, be configured to provide direct conversion functionality. The latter type of circuitry presents a much simpler architecture as compared with standard super-heterodyne mixer circuitries, and any flicker noise brought about by the same may be alleviated for example through the use of OFDM modulation. FIG. 3 illustrates only a simplified version of a radio IC circuitry, and may include, although not shown, embodiments where each of the depicted circuitries may include more than one component. For instance, mixer circuitry 320 and/or 314 may each include one or more mixers, and filter circuitries 308 and/or 312 may each include one or more filters, such as one or more BPFs and/or LPFs according to application needs. For example, when mixer circuitries are of the direct-conversion type, they may each include two or more mixers.

In some embodiments, mixer circuitry 302 may be configured to down-convert RF signals 207 received from the FEM circuitry 104 (FIG. 1) based on the synthesized frequency 305 provided by synthesizer circuitry 304. The amplifier circuitry 306 may be configured to amplify the down-converted signals and the filter circuitry 308 may include a LPF configured to remove unwanted signals from the down-converted signals to generate output baseband signals 307. Output baseband signals 307 may be provided to the baseband processing circuitry 108 (FIG. 1) for further processing. In some embodiments, the output baseband signals 307 may be zero-frequency baseband signals, although this is not a requirement. In some embodiments, mixer circuitry 302 may comprise passive mixers, although the scope of the embodiments is not limited in this respect.

In some embodiments, the mixer circuitry 314 may be configured to up-convert input baseband signals 311 based on the synthesized frequency 305 provided by the synthesizer circuitry 304 to generate RF output signals 209 for the FEM circuitry 104. The baseband signals 311 may be provided by the baseband processing circuitry 108 and may be filtered by filter circuitry 312. The filter circuitry 312 may include a LPF or a BPF, although the scope of the embodiments is not limited in this respect.

In some embodiments, the mixer circuitry 302 and the mixer circuitry 314 may each include two or more mixers and may be arranged for quadrature down-conversion and/or up-conversion respectively with the help of synthesizer 304. In some embodiments, the mixer circuitry 302 and the mixer circuitry 314 may each include two or more mixers each configured for image rejection (e.g., Hartley image rejection). In some embodiments, the mixer circuitry 302 and the mixer circuitry 314 may be arranged for direct down-conversion and/or direct up-conversion, respectively. In some embodiments, the mixer circuitry 302 and the mixer circuitry 314 may be configured for super-heterodyne operation, although this is not a requirement.

Mixer circuitry 302 may comprise, according to one embodiment: quadrature passive mixers (e.g., for the in-phase (I) and quadrature phase (Q) paths). In such an embodiment, RF input signal 207 from FIG. 3 may be down-converted to provide I and Q baseband output signals to be sent to the baseband processor Quadrature passive mixers may be driven by zero and ninety-degree time-varying LO switching signals provided by a quadrature circuitry which may be configured to receive a LO frequency ($f_{LO}$) from a local oscillator or a synthesizer, such as LO frequency 305 of synthesizer 304 (FIG. 3). In some embodiments, the LO frequency may be the carrier frequency, while in other embodiments, the LO frequency may be a fraction of the carrier frequency (e.g., one-half the carrier frequency, one-third the carrier frequency). In some embodiments, the zero and ninety-degree time-varying switching signals may be generated by the synthesizer, although the scope of the embodiments is not limited in this respect.

In some embodiments, the LO signals may differ in duty cycle (the percentage of one period in which the LO signal is high) and/or offset (the difference between start points of the period). In some embodiments, the LO signals may have a 25% duty cycle and a 50% offset. In some embodiments, each branch of the mixer circuitry (e.g., the in-phase (I) and quadrature phase (Q) path) may operate at a 25% duty cycle, which may result in a significant reduction is power consumption.

The RF input signal 207 (FIG. 2) may comprise a balanced signal, although the scope of the embodiments is not limited in this respect. The I and Q baseband output signals may be provided to low-nose amplifier, such as amplifier circuitry 306 (FIG. 3) or to filter circuitry 308 (FIG. 3).

In some embodiments, the output baseband signals 307 and the input baseband signals 311 may be analog baseband signals, although the scope of the embodiments is not limited in this respect. In some alternate embodiments, the output baseband signals 307 and the input baseband signals 311 may be digital baseband signals. In these alternate embodiments, the radio IC circuitry may include analog-to-digital converter (ADC) and digital-to-analog converter (DAC) circuitry.

In some dual-mode embodiments, a separate radio IC circuitry may be provided for processing signals for each spectrum, or for other spectrums not mentioned here, although the scope of the embodiments is not limited in this respect.

In some embodiments, the synthesizer circuitry 304 may be a fractional-N synthesizer or a fractional N/N+1 synthesizer, although the scope of the embodiments is not limited in this respect as other types of frequency synthesizers may be suitable. For example, synthesizer circuitry 304 may be a delta-sigma synthesizer, a frequency multiplier, or a synthesizer comprising a phase-locked loop with a frequency divider. According to some embodiments, the synthesizer circuitry 304 may include digital synthesizer circuitry. An advantage of using a digital synthesizer circuitry is that, although it may still include some analog components, its footprint may be scaled down much more than the footprint of an analog synthesizer circuitry. In some embodiments, frequency input into synthesizer circuitry 304 may be provided by a voltage controlled oscillator (VCO), although that is not a requirement. A divider control input may further be provided by either the baseband processing circuitry 108 (FIG. 1) or the application processor 111 (FIG. 1) depending on the desired output frequency 305. In some embodiments, a divider control input (e.g., N) may be determined from a look-up table (e.g., within a Wi-Fi card) based on a channel number and a channel center frequency as determined or indicated by the application processor 111.

In some embodiments, synthesizer circuitry 304 may be configured to generate a carrier frequency as the output frequency 305, while in other embodiments, the output frequency 305 may be a fraction of the carrier frequency (e.g., one-half the carrier frequency, one-third the carrier frequency). In some embodiments, the output frequency 305 may be a LO frequency ($f_{LO}$).

Figure 4:
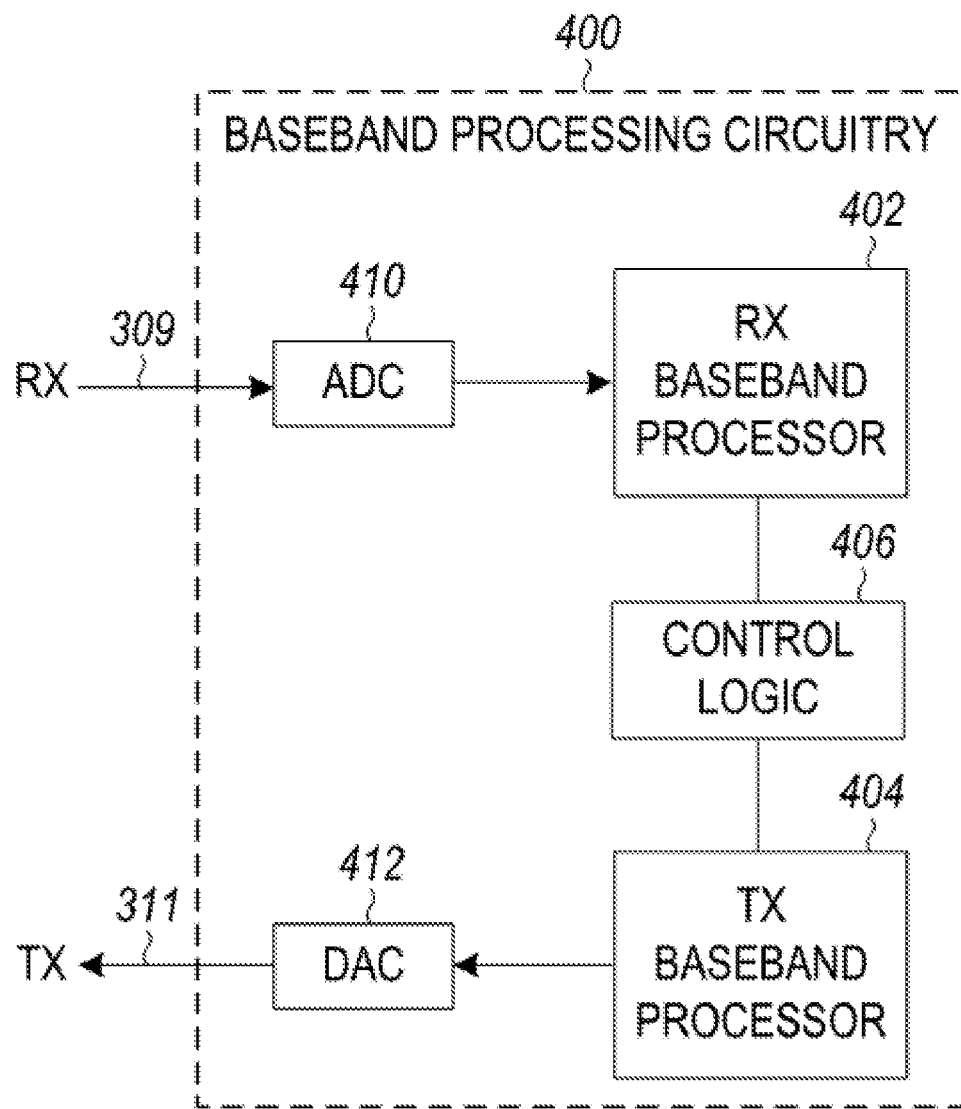
FIG. 4 illustrates a baseband processing circuitry for use in the radio architecture of FIG. 1 in accordance with some embodiments.

FIG. 4 illustrates a functional block diagram of baseband processing circuitry 400 in accordance with some embodiments. The baseband processing circuitry 400 is one example of circuitry that may be suitable for use as the baseband processing circuitry 108 (FIG. 1), although other circuitry configurations may also be suitable. The baseband processing circuitry 400 may include a receive baseband processor (RX BBP) 402 for processing receive baseband signals 309 provided by the radio IC circuitry 106 (FIG. 1) and a transmit baseband processor (TX BBP) 404 for generating transmit baseband signals 311 for the radio IC circuitry 106. The baseband processing circuitry 400 may also include control logic 406 for coordinating the operations of the baseband processing circuitry 400.

In some embodiments (e.g., when analog baseband signals are exchanged between the baseband processing circuitry 400 and the radio IC circuitry 106), the baseband processing circuitry 400 may include ADC 410 to convert analog baseband signals received from the radio IC circuitry 106 to digital baseband signals for processing by the RX BBP 402. In these embodiments, the baseband processing circuitry 400 may also include DAC 412 to convert digital baseband signals from the TX BBP 404 to analog baseband signals.

In some embodiments that communicate OFDM signals or OFDMA signals, such as through baseband processor 108A, the transmit baseband processor 404 may be configured to generate OFDM or OFDMA signals as appropriate for transmission by performing an inverse fast Fourier transform (IFFT). The receive baseband processor 402 may be configured to process received OFDM signals or OFDMA signals by performing an FFT. In some embodiments, the receive baseband processor 402 may be configured to detect the presence of an OFDM signal or OFDMA signal by performing an autocorrelation, to detect a preamble, such as a short preamble, and by performing a cross-correlation, to detect a long preamble. The preambles may be part of a predetermined frame structure for Wi-Fi communication.

Referring back to FIG. 1, in some embodiments, the antennas 101 (FIG. 1) may each comprise one or more directional or omnidirectional antennas, including, for example, dipole antennas, monopole antennas, patch antennas, loop antennas, microstrip antennas or other types of antennas suitable for transmission of RF signals. In some multiple-input multiple-output (MIMO) embodiments, the antennas may be effectively separated to take advantage of spatial diversity and the different channel characteristics that may result. Antennas 101 may each include a set of phased-array antennas, although embodiments are not so limited.

Although the radio-architecture 100 is illustrated as having several separate functional elements, one or more of the functional elements may be combined and may be implemented by combinations of software-configured elements, such as processing elements including digital signal processors (DSPs), and/or other hardware elements. For example, some elements may comprise one or more microprocessors, DSPs, field-programmable gate arrays (FPGAs), application specific integrated circuits (ASICs), radio-frequency integrated circuits (RFICs) and combinations of various hardware and logic circuitry for performing at least the functions described herein. In some embodiments, the functional elements may refer to one or more processes operating on one or more processing elements.

Figure 5:
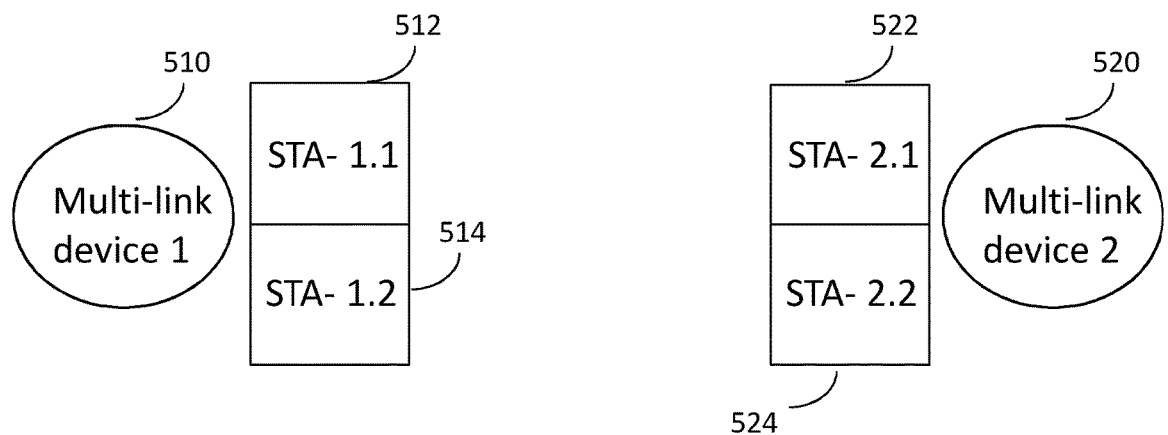
FIG. 5 illustrates a WLAN in accordance with some embodiments.
Figure 5:
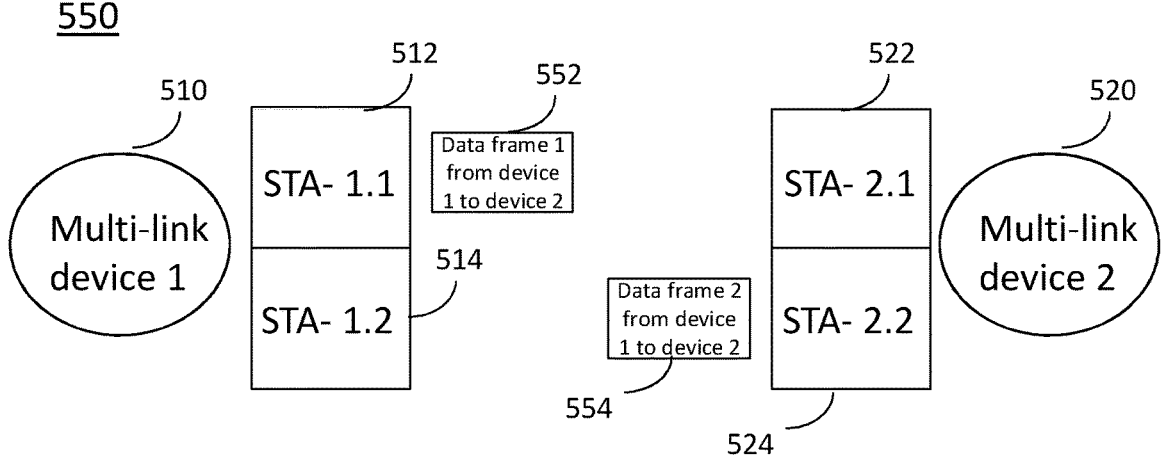

FIG. 5 illustrates a WLAN 500 in accordance with some embodiments. Embodiments are not limited to the number, type, arrangement or other aspects of the elements (such as MLDs, STAs and/or other) shown in the example 500 in FIG. 5. Some embodiments may be related to multi-band buffer management without BA negotiation. Some embodiments may be related to multi-link buffer management without BA negotiation. It should be noted that some descriptions may refer to "multi-band" elements (such as multi-band operation and/or others) and/or "multi-link" elements (such as multi-link operation and/or others), but such references are not limiting. In some descriptions herein, a multi-band element may be replaced by a multi-link element. In some descriptions herein, a multi-link element may be replaced by a multi-band element.

Some embodiments may be related to multi-band operation and/or multi-link operation. Multi-band operation and/or multi-link operation may be used in EHT in some embodiments. Consider a scenario with two multi-link devices 510, 520. The multi-link device 510 may include two STAs (STA-1.1 and STA-1.2, labeled as 512 and 514). The multi-link device 520 may include two STAs (STA-2.1 and STA-2.2, labeled as 522 and 524). Embodiments are not limited to the number of STAs per multi-link device shown in 500, as any number of STAs per multi-link device may be used. Note that a "STA" may be defined as a logical entity that is a singly addressable instance of a MAC and PHY interface to a wireless medium. In some descriptions herein, an "interface" and a "STA" may be used interchangeably.

In a non-limiting example, the multi-link device 510 may communicate on STA-1.1 512 with STA-2.1 522 of the multi-link device 520 on a first wireless link, and the multi-link device 510 may communicate on STA-1.2 514 with STA-2.2 524 of the multi-link device 520 on a second wireless link. In a non-limiting example, one of the wireless links may be in a 5 GHz frequency range, and the other wireless link may be in a 2.4 GHz frequency range. In some embodiments, the STAs 512, 514 may operate in different bands. In some embodiments, the STAs 512, 514 may operate in a same band. In a non-limiting example, STA-1.1 512 may operate in a 5 GHz range, and STA-1.2 514 may operate in a 2.4 GHz range. As another example, STA-1.1 512 may operate in an 80 MHz channel in the 5 GHz range, and STA-1.2 514 may operate in another 80 MHz channel in the 5 GHz range. Embodiments are not limited to the example ranges and channel sizes given in the above examples (and/or other examples herein), as STAs and/or wireless links in other frequency ranges may be used, in some embodiments.

In some embodiments, the WLAN 500 may include one or more multi-link devices (such as 510, 520). In some embodiments, the multi-link device 510, 520 may be an access point (AP) using the IEEE 802.11 to transmit and receive. In some embodiments, the multi-link device 510, 520 may be a base station. In some embodiments, the multi-link device 510,520 may use other communications protocols as well as the IEEE 802.11 protocol. The IEEE 802.11 protocol may be IEEE 802.11ax, EHT-related, and/or other. The IEEE 802.11 protocol may include using orthogonal frequency division multiple-access (OFDMA), time division multiple access (TDMA), and/or code division multiple access (CDMA). The IEEE 802.11 protocol may include a multiple access technique. For example, the IEEE 802.11 protocol may include space-division multiple access (SDMA) and/or multiple-user multiple-input multiple-output (MU-MIMO). The multi-link device 510, 520 may operate in accordance with one or more of IEEE 802.11 a/b/g/n/ac/ad/af/ah/aj/ay, EHT, or another wireless communication standard.

The bandwidth of a channel may be 20 MHz, 40 MHz, or 80 MHz, 160 MHz, 320 MHz contiguous bandwidths or an 80+80 MHz (160 MHz) non-contiguous bandwidth. In some embodiments, the bandwidth of a channel may be 1 MHz, 1.25 MHz, 2.03 MHz, 2.5 MHz, 4.06 MHz, 5 MHz and 10 MHz, or a combination thereof or another bandwidth that is less or equal to the available bandwidth may also be used. In some embodiments the bandwidth of the channels may be based on a number of active data subcarriers. In some embodiments the bandwidth of the channels is based on 26, 52, 106, 242, 484, 996, or 2x996 active data subcarriers or tones that are spaced by 20 MHz. In some embodiments the bandwidth of the channels is 256 tones spaced by 20 MHz. In some embodiments the channels are multiple of 26 tones or a multiple of 20 MHz. In some embodiments a 20 MHz channel may comprise 242 active data subcarriers or tones, which may determine the size of a Fast Fourier Transform (FFT). An allocation of a bandwidth or a number of tones or sub-carriers may be termed a resource unit (RU) allocation in accordance with some embodiments.

In some embodiments, the 26-subcarrier RU and 52-subcarrier RU are used in the 20 MHz, 40 MHz, 80 MHz, 160 MHz and 80+80 MHz OFDMA HE PPDU formats. In some embodiments, the 106-subcarrier RU is used in the 20 MHz, 40 MHz, 80 MHz, 160 MHz and 80+80 MHz OFDMA and MU-MIMO HE PPDU formats. In some embodiments, the 242-subcarrier RU is used in the 40 MHz, 80 MHz, 160 MHz and 80+80 MHz OFDMA and MU-MIMO HE PPDU formats. In some embodiments, the 484-subcarrier RU is used in the 80 MHz, 160 MHz and 80+80 MHz OFDMA and MU-MIMO HE PPDU formats. In some embodiments, the 996-subcarrier RU is used in the 160 MHz and 80+80 MHz OFDMA and MU-MIMO HE PPDU formats.

In example embodiments, the radio architecture of FIG. 1, the front-end module circuitry of FIG. 2, the radio IC circuitry of FIG. 3, and/or the baseband processing circuitry of FIG. 4 may be configured to perform the methods and operations/functions herein described in conjunction with one or more of the figures described herein.

In example embodiments, the multi-link device 510, 520 are configured to perform the methods and operations/functions described herein in conjunction with one or more of the figures described herein. In example embodiments, an apparatus of the multi-link device 510, 520 may be configured to perform the methods and functions described herein in conjunction with one or more of the figures described herein. The term Wi-Fi may refer to one or more of the IEEE 802.11 communication standards.

Figure 6:
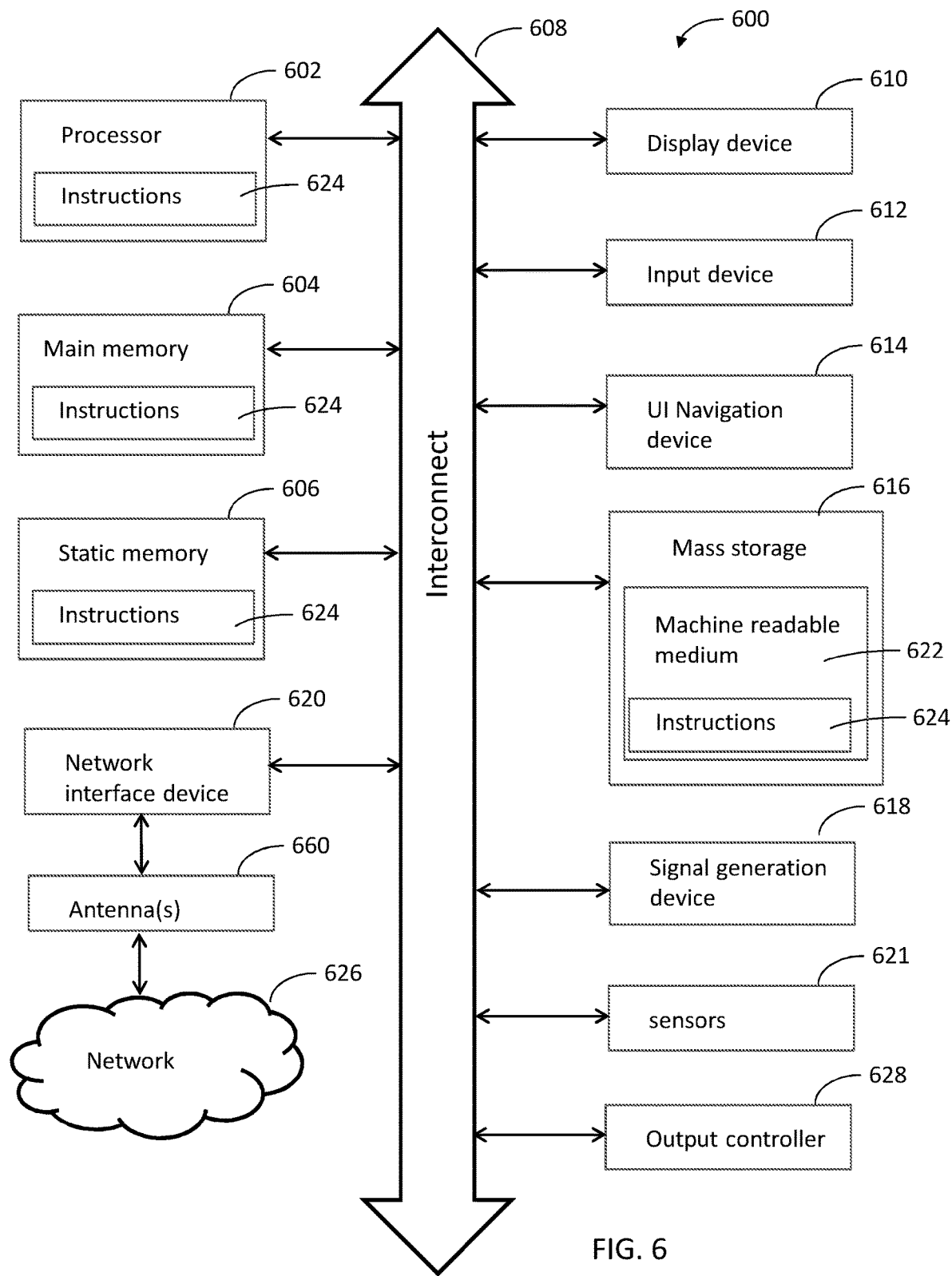
FIG. 6 illustrates a block diagram of an example machine upon which any one or more of the techniques (e.g., methodologies) discussed herein may perform.

FIG. 6 illustrates a block diagram of an example machine 600 upon which any one or more of the techniques (e.g., methodologies) discussed herein may perform. In alternative embodiments, the machine 600 may operate as a standalone device or may be connected (e.g., networked) to other machines. In a networked deployment, the machine 600 may operate in the capacity of a server machine, a client machine, or both in server-client network environments. In an example, the machine 600 may act as a peer machine in peer-to-peer (P2P) (or other distributed) network environment. The machine 600 may be a multi-link device 510, 520, an AP, personal computer (PC), a tablet PC, a set-top box (STB), a personal digital assistant (PDA), a portable communications device, a mobile telephone, a smart phone, a web appliance, a network router, switch or bridge, or any machine capable of executing instructions (sequential or otherwise) that specify actions to be taken by that machine. Further, while only a single machine is illustrated, the term "machine" shall also be taken to include any collection of machines that individually or jointly execute a set (or multiple sets) of instructions to perform any one or more of the methodologies discussed herein, such as cloud computing, software as a service (SaaS), other computer cluster configurations.

Machine (e.g., computer system) 600 may include a hardware processor 602 (e.g., a central processing unit (CPU), a graphics processing unit (GPU), a hardware processor core, or any combination thereof), a main memory 604 and a static memory 606, some or all of which may communicate with each other via an interlink (e.g., bus) 608.

Specific examples of main memory 604 include Random Access Memory (RAM), and semiconductor memory devices, which may include, in some embodiments, storage locations in semiconductors such as registers. Specific examples of static memory 606 include non-volatile memory, such as semiconductor memory devices (e.g., Electrically Programmable Read-Only Memory (EPROM), Electrically Erasable Programmable Read-Only Memory (EEPROM)) and flash memory devices; magnetic disks, such as internal hard disks and removable disks; magneto-optical disks; RAM; and CD-ROM and DVD-ROM disks.

The machine 600 may further include a display device 610, an input device 612 (e.g., a keyboard), and a user interface (UI) navigation device 614 (e.g., a mouse). In an example, the display device 610, input device 612 and UI navigation device 614 may be a touch screen display. The machine 600 may additionally include a mass storage (e.g., drive unit) 616, a signal generation device 618 (e.g., a speaker), a network interface device 620, and one or more sensors 621, such as a global positioning system (GPS) sensor, compass, accelerometer, or other sensor. The machine 600 may include an output controller 628, such as a serial (e.g., universal serial bus (USB), parallel, or other wired or wireless (e.g., infrared (IR), near field communication (NFC), etc.) connection to communicate or control one or more peripheral devices (e.g., a printer, card reader, etc.). In some embodiments the processor 602 and/or instructions 624 may comprise processing circuitry and/or transceiver circuitry.

The storage device 616 may include a machine readable medium 622 on which is stored one or more sets of data structures or instructions 624 (e.g., software) embodying or utilized by any one or more of the techniques or functions described herein. The instructions 624 may also reside, completely or at least partially, within the main memory 604, within static memory 606, or within the hardware processor 602 during execution thereof by the machine 600. In an example, one or any combination of the hardware processor 602, the main memory 604, the static memory 606, or the storage device 616 may constitute machine readable media.

Specific examples of machine readable media may include: non-volatile memory, such as semiconductor memory devices (e.g., EPROM or EEPROM) and flash memory devices; magnetic disks, such as internal hard disks and removable disks; magneto-optical disks; RAM; and CD-ROM and DVD-ROM disks.

While the machine readable medium 622 is illustrated as a single medium, the term "machine readable medium" may include a single medium or multiple media (e.g., a centralized or distributed database, and/or associated caches and servers) configured to store the one or more instructions 624.

An apparatus of the machine 600 may be one or more of a hardware processor 602 (e.g., a central processing unit (CPU), a graphics processing unit (GPU), a hardware processor core, or any combination thereof), a main memory 604 and a static memory 606, sensors 621, network interface device 620, antennas 660, a display device 610, an input device 612, a UI navigation device 614, a mass storage 616, instructions 624, a signal generation device 618, and an output controller 628. The apparatus may be configured to perform one or more of the methods and/or operations disclosed herein. The apparatus may be intended as a component of the machine 600 to perform one or more of the methods and/or operations disclosed herein, and/or to perform a portion of one or more of the methods and/or operations disclosed herein. In some embodiments, the apparatus may include a pin or other means to receive power. In some embodiments, the apparatus may include power conditioning hardware.

The term "machine readable medium" may include any medium that is capable of storing, encoding, or carrying instructions for execution by the machine 600 and that cause the machine 600 to perform any one or more of the techniques of the present disclosure, or that is capable of storing, encoding or carrying data structures used by or associated with such instructions. Non-limiting machine readable medium examples may include solid-state memories, and optical and magnetic media. Specific examples of machine readable media may include: non-volatile memory, such as semiconductor memory devices (e.g., Electrically Programmable Read-Only Memory (EPROM), Electrically Erasable Programmable Read-Only Memory (EEPROM)) and flash memory devices; magnetic disks, such as internal hard disks and removable disks; magneto-optical disks; Random Access Memory (RAM); and CD-ROM and DVD-ROM disks. In some examples, machine readable media may include non-transitory machine readable media. In some examples, machine readable media may include machine readable media that is not a transitory propagating signal. In some examples, machine readable media may include non-transitory computer readable storage media. In some examples, machine readable media may include computer readable storage media.

The instructions 624 may further be transmitted or received over a communications network 626 using a transmission medium via the network interface device 620 utilizing any one of a number of transfer protocols (e.g., frame relay, internet protocol (IP), transmission control protocol (TCP), user datagram protocol (UDP), hypertext transfer protocol (HTTP), etc.). Example communication networks may include a local area network (LAN), a wide area network (WAN), a packet data network (e.g., the Internet), mobile telephone networks (e.g., cellular networks), Plain Old Telephone (POTS) networks, and wireless data networks (e.g., Institute of Electrical and Electronics Engineers (IEEE) 802.11 family of standards known as Wi-Fi®, IEEE 802.16 family of standards known as WiMax®), IEEE 802.15.4 family of standards, a Long Term Evolution (LTE) family of standards, a Universal Mobile Telecommunications System (UMTS) family of standards, peer-to-peer (P2P) networks, among others.

In an example, the network interface device 620 may include one or more physical jacks (e.g., Ethernet, coaxial, or phone jacks) or one or more antennas to connect to the communications network 626. In an example, the network interface device 620 may include one or more antennas 660 to wirelessly communicate using at least one of single-input multiple-output (SIMO), multiple-input multiple-output (MIMO), or multiple-input single-output (MISO) techniques. In some examples, the network interface device 620 may wirelessly communicate using Multiple User MIMO techniques. The term "transmission medium" shall be taken to include any intangible medium that is capable of storing, encoding or carrying instructions for execution by the machine 600, and includes digital or analog communications signals or other intangible medium to facilitate communication of such software.

Examples, as described herein, may include, or may operate on, logic or a number of components, modules, or mechanisms. Modules are tangible entities (e.g., hardware) capable of performing specified operations and may be configured or arranged in a certain manner. In an example, circuits may be arranged (e.g., internally or with respect to external entities such as other circuits) in a specified manner as a module. In an example, the whole or part of one or more computer systems (e.g., a standalone, client or server computer system) or one or more hardware processors may be configured by firmware or software (e.g., instructions, an application portion, or an application) as a module that operates to perform specified operations. In an example, the software may reside on a machine readable medium. In an example, the software, when executed by the underlying hardware of the module, causes the hardware to perform the specified operations.

Accordingly, the term "module" is understood to encompass a tangible entity, be that an entity that is physically constructed, specifically configured (e.g., hardwired), or temporarily (e.g., transitorily) configured (e.g., programmed) to operate in a specified manner or to perform part or all of any operation described herein. Considering examples in which modules are temporarily configured, each of the modules need not be instantiated at any one moment in time. For example, where the modules comprise a general-purpose hardware processor configured using software, the general-purpose hardware processor may be configured as respective different modules at different times. Software may accordingly configure a hardware processor, for example, to constitute a particular module at one instance of time and to constitute a different module at a different instance of time.

Some embodiments may be implemented fully or partially in software and/or firmware. This software and/or firmware may take the form of instructions contained in or on a non-transitory computer-readable storage medium. Those instructions may then be read and executed by one or more processors to enable performance of the operations described herein. The instructions may be in any suitable form, such as but not limited to source code, compiled code, interpreted code, executable code, static code, dynamic code, and the like. Such a computer-readable medium may include any tangible non-transitory medium for storing information in a form readable by one or more computers, such as but not limited to read only memory (ROM); random access memory (RAM); magnetic disk storage media; optical storage media; flash memory, etc.

Figure 7:
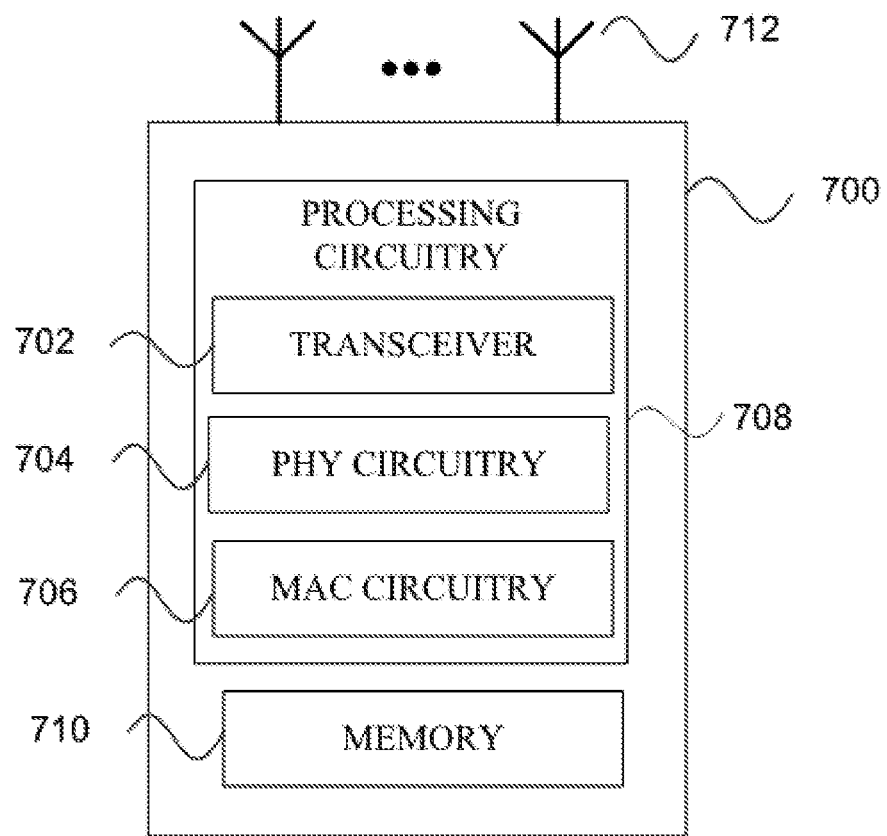
FIG. 7 illustrates a block diagram of an example wireless device upon which any one or more of the techniques (e.g., methodologies or operations) discussed herein may perform.

FIG. 7 illustrates a block diagram of an example wireless device 700 upon which any one or more of the techniques (e.g., methodologies or operations) discussed herein may perform. The wireless device 700 may be a HE device. The wireless device 700 may be a multi-link device 510, 520. A multi-link device 510, 520 may include some or all of the components shown in FIGS. 1-7. The wireless device 700 may be an example machine 600 as disclosed in conjunction with FIG. 6.

The wireless device 700 may include processing circuitry 708. The processing circuitry 708 may include a transceiver 702, physical layer circuitry (PHY circuitry) 704, and MAC layer circuitry (MAC circuitry) 706, one or more of which may enable transmission and reception of signals to and from other wireless devices 700 (e.g., AP 502, STA 504 and/or other devices) using one or more antennas 712. As an example, the PHY circuitry 704 may perform various encoding and decoding functions that may include formation of baseband signals for transmission and decoding of received signals. As another example, the transceiver 702 may perform various transmission and reception functions such as conversion of signals between a baseband range and a Radio Frequency (RF) range.

Accordingly, the PHY circuitry 704 and the transceiver 702 may be separate components or may be part of a combined component, e.g., processing circuitry 708. In addition, some of the described functionality related to transmission and reception of signals may be performed by a combination that may include one, any or all of the PHY circuitry 704 the transceiver 702, MAC circuitry 706, memory 710, and other components or layers. The MAC circuitry 706 may control access to the wireless medium. The wireless device 700 may also include memory 710 arranged to perform the operations described herein, e.g., some of the operations described herein may be performed by instructions stored in the memory 710.

The antennas 712 (some embodiments may include only one antenna) may comprise one or more directional or omnidirectional antennas, including, for example, dipole antennas, monopole antennas, patch antennas, loop antennas, microstrip antennas or other types of antennas suitable for transmission of RF signals. In some multiple-input multiple-output (MIMO) embodiments, the antennas 712 may be effectively separated to take advantage of spatial diversity and the different channel characteristics that may result.

One or more of the memory 710, the transceiver 702, the PHY circuitry 704, the MAC circuitry 706, the antennas 712, and/or the processing circuitry 708 may be coupled with one another. Moreover, although memory 710, the transceiver 702, the PHY circuitry 704, the MAC circuitry 706, the antennas 712 are illustrated as separate components, one or more of memory 710, the transceiver 702, the PHY circuitry 704, the MAC circuitry 706, the antennas 712 may be integrated in an electronic package or chip.

In some embodiments, the wireless device 700 may be a mobile device as described in conjunction with FIG. 6. In some embodiments the wireless device 700 may be configured to operate in accordance with one or more wireless communication standards as described herein (e.g., as described in conjunction with FIGS. 1-6, IEEE 802.11). In some embodiments, the wireless device 700 may include one or more of the components as described in conjunction with FIG. 6 (e.g., display device 610, input device 612, etc.) Although the wireless device 700 is illustrated as having several separate functional elements, one or more of the functional elements may be combined and may be implemented by combinations of software-configured elements, such as processing elements including digital signal processors (DSPs), and/or other hardware elements. For example, some elements may comprise one or more microprocessors, DSPs, field-programmable gate arrays (FPGAs), application specific integrated circuits (ASICs), radio-frequency integrated circuits (RFICs) and combinations of various hardware and logic circuitry for performing at least the functions described herein. In some embodiments, the functional elements may refer to one or more processes operating on one or more processing elements.

In some embodiments, an apparatus of or used by the wireless device 700 may include various components of the wireless device 700 as shown in FIG. 7 and/or components from FIGS. 1-6. Accordingly, techniques and operations described herein that refer to the wireless device 700 may be applicable to an apparatus for a wireless device 700 (e.g., multi-link device 510, 520), in some embodiments. In some embodiments, the wireless device 700 is configured to decode and/or encode signals, packets, and/or frames as described herein, e.g., PPDUs.

The PHY circuitry 704 may be arranged to transmit signals in accordance with one or more communication standards described herein. For example, the PHY circuitry 704 may be configured to transmit a HE PPDU. The PHY circuitry 704 may include circuitry for modulation/demodulation, upconversion/downconversion, filtering, amplification, etc. In some embodiments, the processing circuitry 708 may include one or more processors. The processing circuitry 708 may be configured to perform functions based on instructions being stored in a RAM or ROM, or based on special purpose circuitry. The processing circuitry 708 may include a processor such as a general purpose processor or special purpose processor. The processing circuitry 708 may implement one or more functions associated with antennas 712, the transceiver 702, the PHY circuitry 704, the MAC circuitry 706, and/or the memory 710. In some embodiments, the processing circuitry 708 may be configured to perform one or more of the functions/operations and/or methods described herein.

In accordance with some embodiments, a multi-link device (MLD) 510 may be configured for multi-link communication on a plurality of links. The MLD 510 may be configured with a plurality of stations (STAs) (such as 512, 514), wherein each STA 512, 514 is a logical entity that includes a singly addressable instance of a medium access control (MAC) layer and a physical (PHY) layer of a link of the plurality of links. The MLD 510 may configure traffic identifier (TID) assignment for the MLD 510 for multi-link communication with another MLD 520. The multi-link communication may be configurable to support one or more data streams, wherein each of the data streams corresponds to a TID. The multi-link communication may be between the plurality of STAs 512, 514 of the MLD 510 and a plurality of corresponding STAs (such as 522, 524) of the other MLD 520. To configure the MLD 510 for the multi-link communication, the MLD 510 may: receive, from the other MLD 520, feedback that indicates a proposed assignment of the TIDs to the STAs 512, 514 of the MLD 510; and based at least partly on the feedback, determine an assignment of the TIDs to the STAs 512, 514 of the MLD 510, wherein as part of the assignment, each of the STAs 512, 514 of the MLD 510 is configurable to support one or more of the TIDs. The MLD 510 may transmit data packets for each of the TIDs for the multi-link communication, wherein the data packets may be encoded for transmission on the links in accordance with the determined assignment of the TIDs to the STAs 512, 514. These embodiments are described in more detail below.

Figure 8:
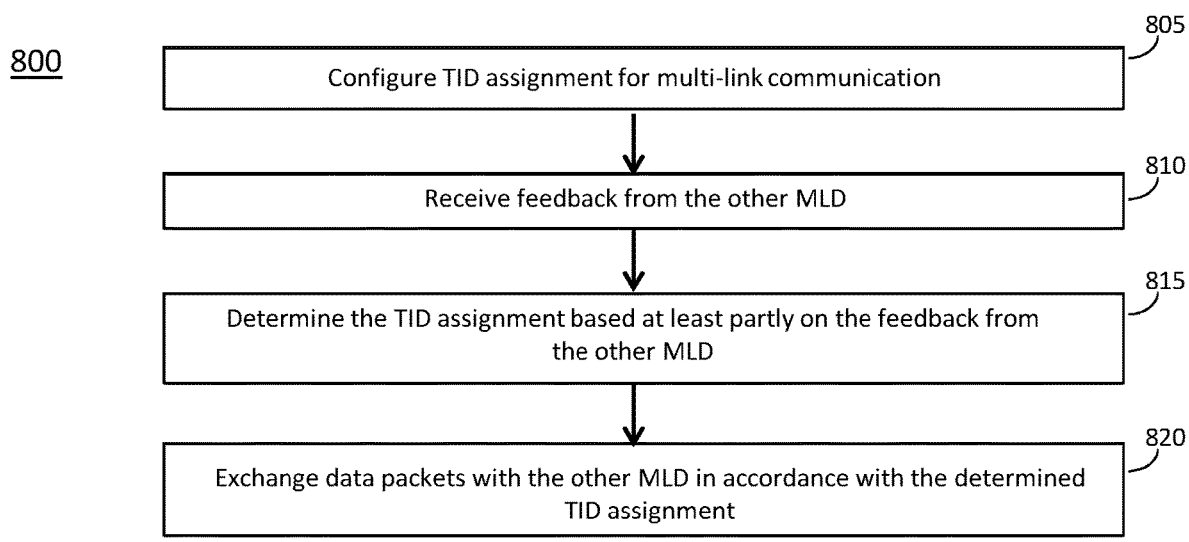
FIG. 8 illustrates the operation of a method in accordance with some embodiments.

FIG. 8 illustrates the operation of a method of communication in accordance with some embodiments. It is important to note that embodiments of the method 800, may include additional or even fewer operations or processes in comparison to what is illustrated in FIG. 8. In addition, embodiments of the method 800 are not necessarily limited to the chronological order that is shown in FIG. 8. In descriptions of the method 800, reference may be made to one or more figures, although it is understood that the method 800, may be practiced with any other suitable systems, interfaces and components.

In some embodiments, a multi-link device (such as 510, 520) may perform one or more operations of the method 800, but embodiments are not limited to performance of the method 800 and/or operations of it by the multi-link device 510, 520. In some embodiments, another device and/or component may perform one or more operations that may be the same as, similar to and/or reciprocal to one or more operations of the method 800.

The method 800 and other methods described herein may refer to multi-link devices 510, 520 and/or other devices configured to operate in accordance with WLAN standards, 802.11 standards and/or other standards. However, embodiments are not limited to performance of those methods by those components, and may also be performed by other devices, such as an Evolved Node-B (eNB), User Equipment (UE) and/or other. In addition, the method 800 and other methods described herein may be practiced by wireless devices configured to operate in other suitable types of wireless communication systems, including systems configured to operate according to Third Generation Partnership Project (3GPP) standards, 3GPP Long Term Evolution (LTE) standards, 5G standards, New Radio (NR) standards and/or other standards.

In some embodiments, the method 800 and/or other method described herein may also be applicable to an apparatus of a multi-link device (such as 510, 520) and/or an apparatus of another device. In some embodiments, an apparatus of a multi-link device (such as 510, 520) may perform one or more operations of the method 800 and/or other operations.

It should also be noted that embodiments are not limited by references herein (such as in descriptions of the method 800 and/or other descriptions herein) to transmission, reception and/or exchanging of elements such as frames, messages, requests, indicators, signals or other elements. In some embodiments, such an element may be generated, encoded or otherwise processed by processing circuitry (such as by a baseband processor included in the processing circuitry) for transmission. The transmission may be performed by a transceiver or other component, in some cases. In some embodiments, such an element may be decoded, detected or otherwise processed by the processing circuitry (such as by the baseband processor). The element may be received by a transceiver or other component, in some cases. In some embodiments, the processing circuitry and the transceiver may be included in a same apparatus. The scope of embodiments is not limited in this respect, however, as the transceiver may be separate from the apparatus that comprises the processing circuitry, in some embodiments.

One or more of the elements (such as messages, operations and/or other) described herein may be included in a standard and/or protocol, including but not limited to WLAN, IEEE 802.11, EHT and/or other. The scope of embodiments is not limited to usage of those elements, however. In some embodiments, different elements, similar elements, alternate elements and/or other elements may be used. The scope of embodiments is also not limited to usage of elements that are included in standards.

At operation 805, the MLD 510 may configure TID assignment for multi-link communication. At operation 810, the MLD 510 may receive feedback from the other MLD 520. At operation 815, the MLD 510 may determine the TID assignment based at least partly on the feedback from the other MLD 520. At operation 820, the MLD 510 may exchange data packets with the other MLD 520 in accordance with the determined TID assignment.

In some embodiments, the MLD 510 may be configured for multi-link communication on a plurality of links, wherein the MLD 510 is configured with a plurality of stations (STAs) (such as 512, 514). It should be noted that some descriptions herein may refer to an MLD 510 with two STAs 512, 514, but embodiments are not limited to usage of two STAs 512, 514. In some embodiments, more than two STAs may be used. In some embodiments, each STA 512, 514 is a logical entity that includes a singly addressable instance of a medium access control (MAC) layer and a physical (PHY) layer of a link of the plurality of links.

In some embodiments, the MLD 510 may configure traffic identifier (TID) assignment for the MLD 510 for multi-link communication with another MLD 520. In some embodiments, the multi-link communication may be configurable to support one or more data streams, wherein each of the data streams corresponds to a TID. In some embodiments, the multi-link communication may be between the plurality of STAs 512, 514 of the MLD 510 and a plurality of corresponding STAs 522, 524 of the other MLD 520. In some embodiments, to configure the MLD 510 for the multi-link communication, the MLD 510 may perform one or more of: receive, from the other MLD 520, feedback that indicates a proposed assignment of the TIDs (including but not limited to assignment of the TIDs to the STAs 512, 514 of the MLD 510); based at least partly on the feedback, determine an assignment of the TIDs to the STAs 512, 514 of the MLD 510; and/or other. In some embodiments, as part of the assignment, each of the STAs 512, 514 of the MLD 510 may be configurable to support one or more of the TIDs.

In some embodiments, the MLD 510 may transmit one or more data packets for each of the TIDs for the multi-link communication. In some embodiments, the data packets may be encoded for transmission on the links in accordance with the determined assignment of the TIDs to the STAs 512, 514.

In some embodiments, the MLD 510 may configure the TID assignment of the MLD 510 for the multi-link communication with the other MLD 520 independent of block ack (BA) negotiation.

In some embodiments, to configure the MLD for the multi-link communication, the MLD 510 may perform one or more of: determine an initial assignment of the TIDs to the STAs 512, 514 of the MLD 510; transmit, to the other MLD 520, signaling that indicates the initial assignment of the TIDs to the STAs 512, 514 of the MLD 510; determine the assignment of the TIDs to the STAs 512, 514 of the MLD 510 based further on the initial assignment of the TIDs to the STAs 512, 514 of the MLD 510.

In some embodiments, the MLD 510 may determine the initial assignment of the TIDs to the STAs 512, 514 of the MLD 510 based on one or more of: a quality-of-service (QoS) parameter of one of the data streams, a target latency of one of the data streams, a data rate of one of the data streams, and/or other.

In some embodiments, the MLD 510 may transmit, to the other MLD 520, signaling that indicates the assignment of the TIDs to the STAs 512, 514 of the MLD 510.

In some embodiments, the assignment of the TIDs may be based on configuration information from the MLD 510 and/or configuration information from the other MLD 520. In some embodiments, the configuration information (of the MLD 510 and/or other MLD 520) may be related to, for each of the STAs 512, 514 of the MLD 510 and for each of the STAs 522, 524 of the other MLD 520, one or more of: an operating frequency band, an operating channel, a MAC address, whether a frequency band or channel is configurable for TID sharing, shared buffer size information per TID, and/or other.

In some embodiments, the MLD 510 may create a solicited or unsolicited feedback frame from the MLD 510 for a TID for which the MLD 510 is a recipient. In some embodiments, the feedback frame may indicate a remaining buffer size of a TID and/or other information.

In some embodiments, the MLD 510 may create a solicited or unsolicited feedback frame from the MLD 510 for a TID for which the MLD 510 is a recipient. In some embodiments, the feedback frame may indicate if further transmission of the TID is to continue and/or other information.

In some embodiments, the plurality of STAs 512, 514 may include a first STA 512 and a second STA 514. The first STA 512 may be for a first link in a first frequency band, and the second STA 514 may be for a second link in a second frequency band. In a non-limiting example, the first frequency band may be in a 5 giga-Hertz (GHz) range, and the second frequency band may be in a 2.4 GHz range.

In some embodiments, the plurality of STAs 512, 514 may include a first STA 512 and a second STA 514. The first STA 512 may be for a first channel in a frequency band, and the second STA 514 may be for a second channel in the frequency band.

In some embodiments, the feedback from the other MLD 520 may be received as part of one or more of: a negotiation related to hybrid automatic repeat request (HARM), a negotiation related to multi-link association, a negotiation related to multi-link operation, and an element that may be carried in management frame related to any negotiation.

In some embodiments, the signaling of the assignment of the TIDs to the STAs 512, 514 of the MLD 510 may include: 1) for each of the STAs 512, 514 of the MLD 510, indication of one or more TIDs, or 2) for each of the TIDs, indication of one or more of the STAs 512, 514 of the MLD 510.

In some embodiments, the MLD 510 may be an access point MLD (AP-MLD).

In some embodiments, to configure the MLD 510 for the multi-link communication, the MLD 510 may perform one or more of: 1) determine an assignment of the TIDs to the STAs 512, 514 of the MLD 510, wherein as part of the assignment, each of the STAs 512, 514 of the MLD 510 is configurable to support one or more assigned TIDs; 2) transmit, to the other MLD 510, signaling that indicates the determined assignment of the TIDs to the STAs 512, 514 of the MLD 510; and/or 3) other. In some embodiments, the MLD 510 may transmit data packets for each of the TIDs for the multi-link communication, wherein the data packets may be encoded for transmission on the links in accordance with the determined assignment of the TIDs to the STAs 512, 514.

In some embodiments, an apparatus of an MLD 510 may comprise memory. The memory may be configurable to store one or more elements and the apparatus may use them for performance of one or more operations. The apparatus may include processing circuitry, which may perform one or more operations (including but not limited to operation(s) of the method 800 and/or other methods described herein). The processing circuitry may include a baseband processor. The baseband circuitry and/or the processing circuitry may perform one or more operations described herein, including but not limited to one or more operations of the method 800. The apparatus may include a transceiver to transmit and/or receive one or more blocks, messages and/or other elements.

It should be noted that the examples shown in the FIGS. 1-8 may illustrate some or all of the concepts and techniques described herein in some cases, but embodiments are not limited by the examples. For instance, embodiments are not limited by the name, number, type, size, ordering, arrangement of elements (such as devices, operations, messages and/or other elements) shown in FIGS. 1-8. Although some of the elements shown in the examples of FIGS. 1-8 may be included in a WLAN standard, Wi-Fi standard, 802.11 standard, and/or other standard, embodiments are not limited to usage of such elements that are included in standards.

In some embodiments, a device may transmit/receive data frames of a TID stream in any of two STAs. It should be noted that in some cases (including but not limited to some Wi-Fi designs), data frame transmission by two STAs (and/or interfaces) may be viewed as different streams (for instance, sequence number of the data frame in two STAs/interfaces is independent).

In some cases, not all the data frames are transmitted under BA negotiation. There may exist data frames that are not transmitted under BA negotiation. In some cases, for the data frames that are transmitted without BA negotiation, only one MPDU is transmitted at one time, and an Ack frame rather than the BA frame is used to acknowledge the reception.

In some embodiments, under multi-link (and/or multi-band) operation, if we want to have a TID stream to be transmitted across interfaces without BA negotiation, we may have one or more of the following considerations. 1) An approach may be needed for both two devices to agree on which interface to share TID stream and allow data frame of a TID to be transmitted across interfaces, and 2) a consideration may be related to two data frames of a TID that are transmitted by two different STAs (and/or interfaces). A non-limiting example of #2 is shown in 550 of FIG. 5. Depending on the processing speed of device 2 (520) by different STAs (and/or on different interfaces), data frame 1 (such as 552 in FIG. 5) may be processed by device 2 (520) later than data frame 1 even though data frame 1 arrives earlier than data frame 2 (such as 554 in FIG. 5). Accordingly, data frame 1 and data frame 2 then arrives out of order on device 2 (520).

We note that except the case mentioned above, due to the introduction of HARQ, it is also possible that ADDBA negotiation may be replaced to provide solely HARQ feedback. As a result, in some cases, an approach may be needed for both two devices to agree on which interface to share TID stream and allow data frame of a TID to be transmitted across interfaces for HARQ feedback as well.

In some embodiments, TID switching and/or TID sharing between two devices without BA negotiation may be used. In some embodiments, signaling proposed herein may be part of any negotiation to enable data transmission including HARQ. In some embodiments, signaling proposed herein may be part of any negotiation like association. In some embodiments, a flow control mechanism for a TID sharing stream between two devices may be used. In some cases, such a mechanism may be used for one or more purposes, including but not limited to usage to maintain in order transmission of a TID sharing stream under multi-link operation (and/or multi-band operation) without BA negotiation.

In some cases, data transmission between two devices may be performed under multi-link operation (and/or multi-band operation) without BA negotiation.

Some embodiments may enable one or more of: multi-link TID switching, multi-band TID switching, multi-link TID sharing and/or multi-band TID sharing between two devices without BA negotiation. We propose to have isolated STA information (and/or interface information) for multi-link TID switching, multi-band TID switching, multi-link TID sharing and/or multi-band TID sharing, which may include one or more of the following. In some embodiments, the STA information (and/or interface information) may include information of operating band/channel for each STA (and/or interface). Examples include operating class, channel number, Band ID, the TIDs that are operating on each STA (and/or interface), and/or other.

In some embodiments, the STA information (and/or interface information) may include STA address information for each STA (and/or interface). In a non-limiting example, the indication may be related to one or more MAC addresses. For instance, a MAC address of the STA that transmits data (originator), a MAC address of the STA that receives data (recipient), and/or other MAC address(es) may be used.

In some embodiments, the STA information (and/or interface information) may include TID sharing indication for each interface. When the indication is set, it may mean that the band/channel indicated for a STA (and/or interface) that allows TID sharing with other interfaces with the same TID sharing indication may be used. In a non-limiting example, a TID can be provided to limited the TID sharing operation to certain TID. In some embodiments, TID switching indication for each interface may be used. When the indication is set, it may mean that the band/channel indicated for a STA (and/or interface) that allows TID switching to/from other interfaces with the same TID switching indication. In a non-limiting example, a TID can be provided to limited the TID sharing operation to certain TID.

In some embodiments, the STA information may be added in a negotiation, including but not limited to one or more of the following: negotiation for BA, negotiation for HARQ, negotiation for multi-band association operation, negotiation for general multi-band operation. In some embodiments, the STA information may be included in an element. In some embodiments, the STA information may be combined with an existing element. In some embodiments, the STA information may be included in a management frame.

In some embodiments, the STA information may include shared buffer size information. In a non-limiting example, the shared buffer size information may indicate the total buffer size for TID sharing operation. In some embodiments, additional constraints can be added for specific feedback negotiation like HARQ or BA for the indicated total buffer size. In a non-limiting example, a default buffer size of 1 can be used when there is no additional feedback negotiation.

In some embodiments, one or more of the following may be used for the flow control mechanism for multi-band operation without BA negotiation. In some embodiments, the proposed mechanism may be used for TID sharing situation. In some embodiments, in some cases (including but not limited to a special case of buffer size 1, which may be the default operation without BA negotiation or any other feedback negotiation) the feedback may be an Ack frame. In some embodiments, a new variant of Ack frame may be used. In some embodiments, a flow control indication may be added to the Ack frame or new variant of Ack frame. In some embodiments, the flow control indication can be one bit to indicate if further transmission of the TID stream can proceed or further transmission of the TID stream needs to be stopped. In some embodiments, the following may be used: an unsolicited Ack frame or new variant of Ack frame with flow control indication to resume further transmission of the TID stream. In some embodiments, the following may be used: other frame(s) to have flow control indication to resume further transmission of the TID stream. In some embodiments, capability on both sides to support flow control mechanism may be used.

In some embodiments, in some cases (including but not limited to cases related to a general operation of any buffer size, which is traditionally handled by BA), one or more of the following may be used: capability on both sides to support flow control mechanism; new variants of feedback frame, which can be the feedback frame for HARQ; a flow control indication is added to the new variants of feedback frame; the flow control indication indicates how many further data frames are allowed for the transmission; unsolicited feedback frame with flow control indication to resume further transmission of the TID stream; other frames to have flow control indication to resume further transmission of the TID stream; and/or other.

The Abstract is provided to comply with 37 C.F.R. Section 1.72(b) requiring an abstract that will allow the reader to ascertain the nature and gist of the technical disclosure. It is submitted with the understanding that it will not be used to limit or interpret the scope or meaning of the claims. The following claims are hereby incorporated into the detailed description, with each claim standing on its own as a separate embodiment.

What is claimed is:

1. An apparatus of a multi-link device (MLD) configured for multi-link communication on a plurality of links, wherein the MLD is configured with a plurality of stations (STAs), wherein each STA is a logical entity that includes a singly addressable instance of a medium access control (MAC) layer and a physical (PHY) layer of a link of the plurality of links, wherein the MLD comprises: memory; and processing circuitry, wherein the processing circuitry is configured to:

configure traffic identifier (TID) assignment for the MLD for multi-link communication with another MLD, wherein the multi-link communication is configurable to support one or more data streams, wherein each of the data streams corresponds to a TID, wherein the multi-link communication is between interfaces of the plurality of STAs of the MLD and corresponding interfaces of a plurality of corresponding STAs of the other MLD, wherein to configure the MLD for the multi-link communication, the processing circuitry is configured to:

determine by agreement with the other MLD, which of the interfaces is to share the data streams corresponding to each of TIDs to allow data packets of the TIDs to be transmitted across more than one of the interfaces; and encode data packets for each of the TIDs for the multi-link communication, the data packets encoded for transmission on the links in accordance with the TID assignment, wherein the data packets of at least one of the TIDs are transmitted from more than one interface of any one or more of the STAs of the MLD to the more than one of the corresponding interfaces of one or more of the corresponding STAs of the other MLD based on the agreement, and wherein the agreement is determined for transmission of each of the TIDs for multi-link communication without block ack (BA) negotiation.

2. The apparatus according to claim 1, wherein the processing circuitry is configured to configure the TID assignment of the MLD for the multi-link communication with the other MLD independent of the BA negotiation.

3. The apparatus according to claim 1, wherein the processing circuitry is further configured to:

determine an assignment of the TIDs to the STAs of the MLD based on one or more of:

a quality-of-service (QoS) parameter of one of the data streams, a target latency of one of the data streams, and a data rate of one of the data streams.

4. The apparatus according to claim 3, wherein the processing circuitry is further configured to:

encode, for transmission to the other MLD, signaling that indicates the assignment of the TIDs to the STAs of the MLD.

5. The apparatus according to claim 4, wherein the assignment of the TIDs is based on configuration information from the MLD and the other MLD, wherein the configuration information is related to, for each of the STAs of the MLD and for each of the STAs of the other MLD, one or more of:

an operating frequency band,
an operating channel,
a MAC address,
whether a frequency band or channel is configurable for TID sharing, and
shared buffer size information per TID.

6. The apparatus according to claim 5, the processing circuitry further configured to:

create a solicited or unsolicited feedback frame from the MLD for a TID for which the MLD is a recipient, wherein the feedback frame indicates a remaining buffer size of a TID.

7. The apparatus according to claim 5, the processing circuitry further configured to:

create a solicited or unsolicited feedback frame from the MLD for a TID for which the MLD is a recipient, wherein the feedback frame indicates if further transmission of the TID is to continue.

8. The apparatus according to claim 1, wherein:
the plurality of STAs includes a first STA and a second STA,
the first STA is for a first link in a first frequency band, and
the second STA is for a second link in a second frequency band.

9. The apparatus according to claim 8, wherein:
the first frequency band is in a 5 giga-Hertz (GHz) range, and
the second frequency band is in a 2.4 GHz range.

10. The apparatus according to claim 1, wherein:
the plurality of STAs includes a first STA and a second STA,
the first STA is for a first channel in a frequency band, and
the second STA is for a second channel in the frequency band.

11. The apparatus according to claim 1, wherein the feedback from the other MLD is received as part of one or more of:

a negotiation related to hybrid automatic repeat request (HARM),
a negotiation related to multi-link association,
a negotiation related to multi-link operation, and
an element that may be carried in management frame related to any negotiation.

12. The apparatus according to claim 1, further comprising signaling of the assignment of the TIDs to the STAs of the MLD, the signalling includes:

for each of the STAs of the MLD, indication of one or more TIDs, or for each of the TIDs, indication of one or more of the STAs of the MLD.

13. The apparatus according to claim 1, wherein the MLD is an access point MLD (AP-MLD).

14. The apparatus according to claim 1, wherein:
the processing circuitry includes a baseband processor to determine the assignment of the TIDs to the STAs of the MLD, and
the memory is configured to store the assignment of the TIDs to the STAs of the MILD.

15. A non-transitory computer-readable storage medium that stores instructions for execution of operations by processing circuitry of a multi-link device (MLD), wherein the MLD is configured for multi-link communication on a plurality of links, wherein the MLD is configured with a plurality of stations (STAs), wherein each STA is a logical entity that includes a singly addressable instance of a medium access control (MAC) layer and a physical (PHY) layer of a link of the plurality of links, wherein the operations configure the processing circuitry to:

configure the MLD for multi-link communication with another MLD, wherein the multi-link communication is configurable to support one or more data streams, wherein each of the data streams corresponds to a traffic identifier (TID), wherein the multi-link communication is between interfaces of the plurality of STAs of the MLD and corresponding interfaces of a plurality of corresponding STAs of the other MLD, wherein to configure the MLD for the multi-link communication, the operations configure the processing circuitry to determine by agreement with the other MLD, which of the interfaces is to share the data streams corresponding to each of TIDs to allow data packets of the TIDs to be transmitted across more than one of the interfaces; and encode data packets for each of the TIDs for the multi-link communication, the data packets encoded for transmission on the links in accordance with the TID assignment, wherein the data packets of at least one of the TIDs are transmitted from more than one interface of any one or more of the STAs of the MLD to the more than one of the corresponding interfaces of one or more of the corresponding STAs of the other MLD based on the agreement, and\ wherein the agreement is determined for transmission of each of the TIDs for multi-link communication without block ack (BA) negotiation.

16. The non-transitory computer-readable storage medium according to claim 15, wherein the MLD is an access point MLD (AP-MLD).

17. A method, comprising:

configuring traffic identifier (TID) assignment for a multi-link device (MLD) for multi-link communication with another MLD, wherein the MLD is configured for multi-link communication on a plurality of links, wherein the MLD is configured with a plurality of stations (STAs), wherein each STA is a logical entity that includes a singly addressable instance of a medium access control (MAC) layer and a physical (PHY) layer of a link of the plurality of links, wherein the method comprises:

configuring traffic identifier (TID) assignment for the MLD for multi-link communication with another MLD, wherein the multi-link communication is configurable to support one or more data streams, wherein each of the data streams corresponds to a TID, wherein the multi-link communication is between interfaces of the plurality of STAs of the MLD and corresponding interfaces of a plurality of corresponding STAs of the other MLD;

determining by agreement with the other MLD, which of the interfaces is to share the data streams corresponding to each of TIDs to allow data packets of the TIDs to be transmitted across more than one of the interfaces; and encoding data packets for each of the TIDs for the multi-link communication, the data packets encoded for transmission on the links in accordance with the TID assignment, wherein the data packets of at least one of the TIDs are transmitted from more than one interface of any one or more of the STAs of the MLD to the more than one of the corresponding interfaces of one or more of the corresponding STAs of the other MLD based on the agreement, and wherein the agreement is determined for transmission of each of the TIDs for multi-link communication without block ack (BA) negotiation.

18. The method according to claim 17, wherein the configuring the TID assignment is independent of the BA negotiation.

* * * * *